June 28, 1955     O. P. KNAPP     2,711,567
MOLD CLAMPING APPARATUS
Filed Dec. 24, 1952     2 Sheets-Sheet 2
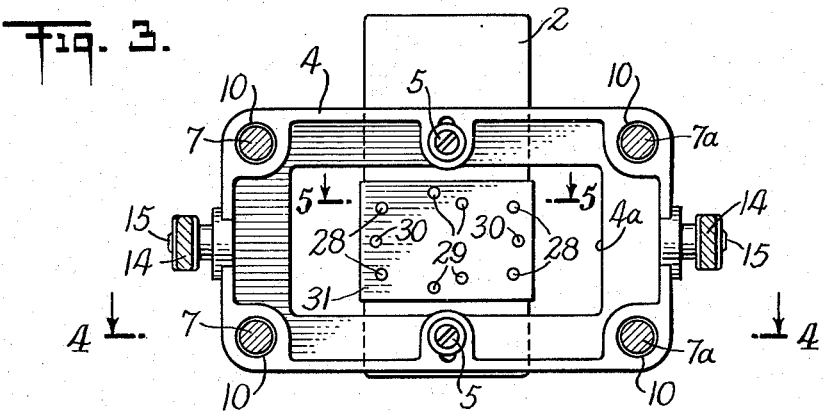
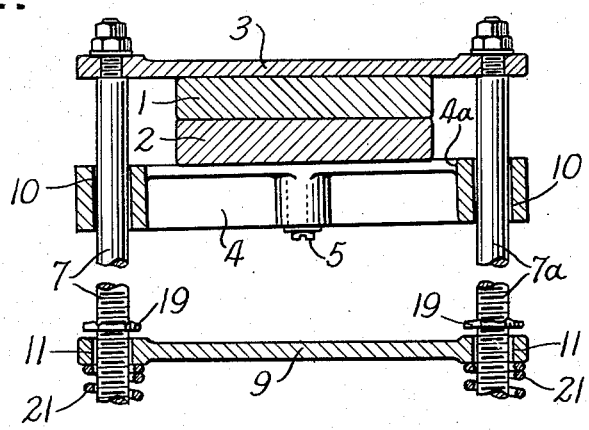
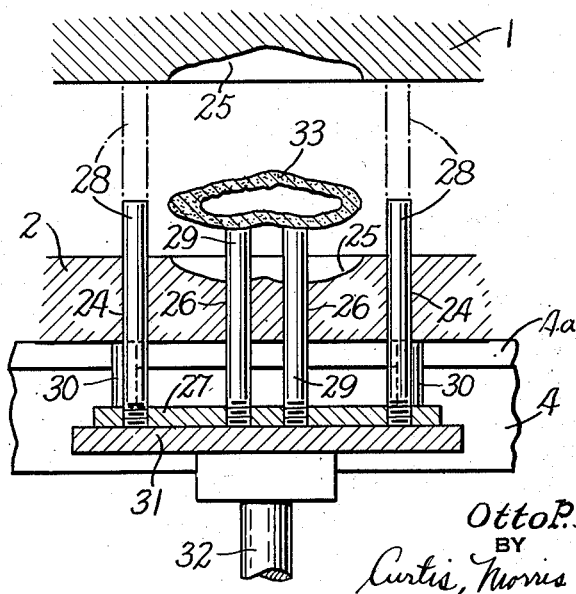
INVENTOR
Otto P. Knapp
BY
Curtis, Morris + Safford
ATTORNEYS United States Patent Office 2,711,567
Patented June 28, 1955

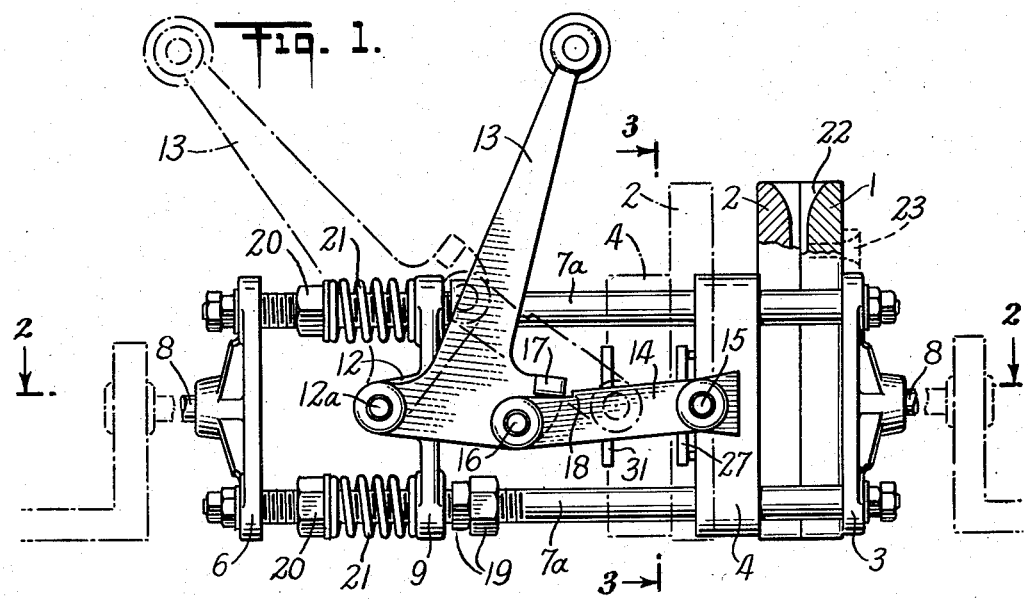
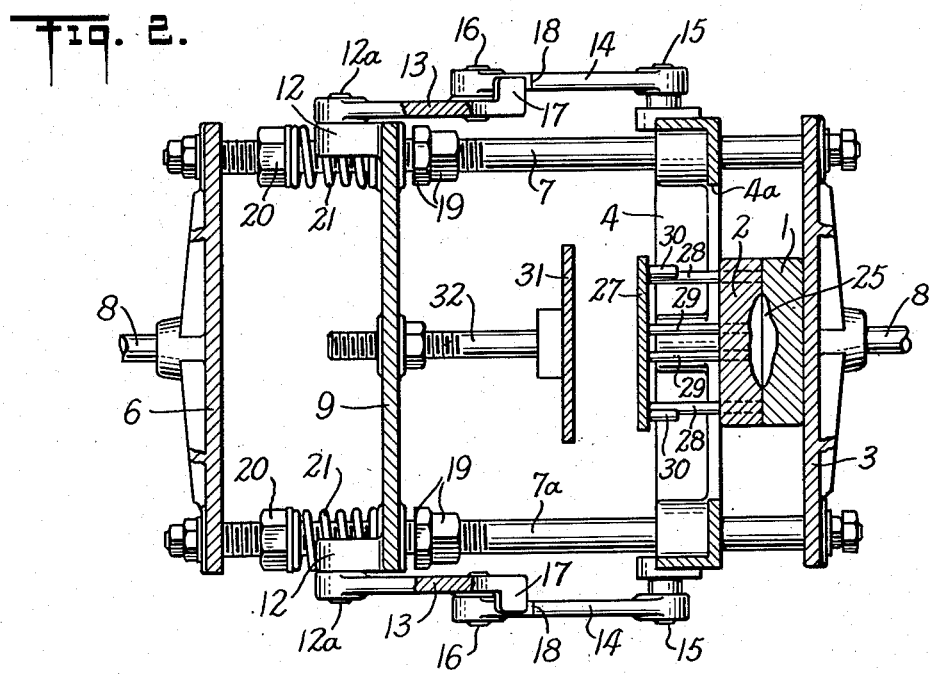
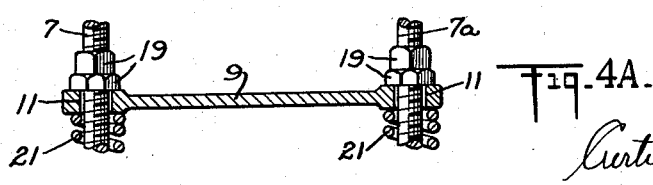

2,711,567

MOLD CLAMPING APPARATUS

Otto P. Knapp, Flushing, N. Y.

Application December 24, 1952, Serial No. 327,816

1 Claim. (Cl. 22—92)

The present invention relates to casting equipment and more particularly to an improvement whereby the mold parts may be operated more effectively both in preparation for receiving the molten charge and in ejecting the casting from the mold cavity.

Known procedures employed in many small foundries and molding plants result in a low production rate. For example, it is common practice for workers in small castings to secure the mold parts together for each casting by one or more hand-operated C-clamps, or the like. This takes an excessive amount of time and produces lack of precision and uniformity in the resulting castings. One object of the invention, therefore, has been to provide a mold clamp construction by which the mold parts can be clamped together quickly, accurately and securely and with substantially uniform conditions present for each casting operation.

One difficulty encountered in casting small objects is that the opposed cavity sealing faces of some mold parts employed for that purpose do not, when clamped in operative position, engage with uniform tightness around the entire mold cavity periphery; nor do they engage uniformly in repeated casting operations. Consequently the castings emerge with excess edge material to be removed and with undesirable variations from the required pattern. A further object of the invention has been to provide a mold clamp which, in use, will hold the mold parts, even though imperfect, uniformly in effectively snug or tight engagement during casting, for example, in a case where the plane of the cavity side face of one of said mold parts, when assembled for casting, is not accurately parallel with the plane of the cavity side face of the other mold part, as might occur where the mold parts are not machined to close tolerances.

In hand operations, as commonly practiced in small shops, the molds when clamped together with C-clamps are supported and manipulated by hand with resulting slowness and uneven production. A further object of the invention has been to provide a molding device wherein the mold parts for casting a given item are held in a suitable clamp which may be mounted to be easily and quickly rotatable from charging position to discharge position and return; and which can be operated rapidly to discharge the casting and again close the mold without injury to the parts and without upsetting any desired uniform or effective casting relation of the mold parts. It is contemplated that this arrangement will afford, to those shops which are presently limited to hand casting, some of the advantages enjoyed in operation of die or machine casting equipment.

In the case of various types of small castings, it is often not essential that they be solid. In other words, for some purposes, such castings are adequate or even preferred in the form of hollow shells. Where these can be produced with no greater expenditure of time and labor than in solid casting, they may represent substantial savings in metal cost. A further object of the invention has therefore been to provide a mold and mold clamp whereby, in operation, a portion of the molten charge may be quickly and easily poured out of the mold with a minimum of labor thus leaving a hollow core within a cast shell of congealed metal.

The invention is accordingly embodied in a mold clamp having a front plate with means for rigidly supporting a first mold part, a rear plate secured in fixed spaced relation to said front plate by parallel rods, a presser frame having an opening and means for supporting a second or movable mold part—which is complemental to said first part—opposite said opening, said presser frame being mounted on said rods in such a manner as to tilt or swing slightly thereon and to be slidable toward and from the front plate, a buffer plate mounted on said rods between said presser frame and said rear plate and slidable and slightly tiltable thereon, said buffer plate being spring biased toward the presser frame and separate means on each rod for varying the extent of compression of the several biasing springs.

The invention also includes a mold part which is mounted on and movable with the presser frame and provided with pin receiving holes extending transversely therethrough, opposite said opening in the presser frame, one set of said holes opening through the inner contact surface of said mold part and another set opening through the mold cavity surface, a pin carrier at the rear of said movable part and provided with three sets of pins, the first and second of which in operation extend through said opening in the presser frame and engage said first and second sets, respectively, of said sets of holes in the movable mold part; and the third set of which consists of relatively short pins which operate as stops against rear face portions of said movable mold part, a stop plate arranged in the path of withdrawal movement of the pin carrier as the latter is moved rearwardly with the presser frame and the mold part thereon to carry the movable mold part away from the fixed mold part, and means for moving said presser frame toward and from said fixed plate.

One embodiment of my invention is described and its mode of operation explained in the following specification and is illustrated in the appended drawings wherein:

Figure 1 is a side elevation with parts broken away to show details of construction;

Figure 2, a horizontal longitudinal section on the line 2—2 of Figure 1;

Figure 3, a transverse vertical section on the line 3—3 of Figure 1;

Figure 4, a fragmentary view partly in section on the line 4—4 of Figure 3 showing conditions of operation where one mold part is defective in that the thickness thereof is not uniform from end to end;

Figure 4A, a fragmentary view of parts shown in Figure 4 but arranged in their relative positions when the operating lever occupies the retracted broken line position of Figure 1; and Figure 5, a fragmentary view, partly in section on the line 5—5 of Figure 3, showing the pin carrier in an end position reached in ejecting the casting from the mold cavity of the movable mold part.

As indicated in the drawings, molding or casting apparatus according to my invention includes broadly a mold clamp for holding the mold parts, a set of mold parts, and means for ejecting the casting from the mold cavity. More specifically and for molding relatively small items, a suitable mold comprising a fixed part 1 and a movable part 2, is mounted in the clamp with mold part 1 secured to a front plate 3 and mold part 2 secured to a presser frame 4 of the clamp, as by bolts 5, Figure 3, said mold part 2 having its mid portion extending across the central opening 4a in frame 4.

Front plate 3 is rigidly assembled with a rear plate 6 by means of parallel rods 7 and 7a of which four are shown. Said front and rear plates are provided with trunnions 8 by which the clamp may be supported upon and between suitable bearings, indicated in dotted lines Figure 1, so that it is conveniently rotatable on its central longitudinal axis between charging and ejecting positions.

A buffer plate 9 is slidably mounted on said rods 7 and 7a between presser frame 4, also slidably mounted thereon, and rear plate 6. As shown in Figures 1 and 4, rods 7, 7a pass through holes 10 in presser frame 4 and holes 11 in buffer plate 9. In each case, the diameter of said holes 10 and 11 is sufficiently greater than that of said rods to permit a slight play or rocking or tilting movement of said frame 4 and plate 9 in relation to the rods.

Buffer plate 9 is provided with brackets 12 to which is pivoted at 12a a U-shaped operating handle 13. Toggle links 14 pivoted to presser frame 4 at 15 are pivotally connected to handle 13 at 16. Stop lugs 17 on handle 13 are positioned to engage shoulders 18 on said toggle links 14 to limit the forward or mold closing movement of said handle 13.

Buffer plate 9 is adjustable to any desired operating position along the threaded or rear portion of rods 7, 7a between the forward stop nuts 19 and the rearward nuts 20 thereon. Compression springs 21 mounted on said rods between buffer plate 9 and nuts 20 bias said buffer plate forwardly, or toward the mold part 1. By adjusting said nuts 20, the extent of spring pressure at each corner of buffer plate 9 and hence of presser frame 4 may be independently controlled.

It is contemplated that an acceptable mold clamp is preferably usable with molds of different sizes and thicknesses. Accordingly, in using such apparatus as above described, the mold parts 1 and 2 of appropriate size for the clamp are secured respectively to plate 3 and frame 4; and their inside or opposed faces are brought together by moving presser frame 4 toward fixed plate 3 by means of handle 13. The nuts 19 are positioned along rods 7, 7a so that the toggle joint parts, including handle 13 and links 14, assume the relative positions approximately as shown in full lines in Figure 1. The nuts 20 are now adjusted along rods 7, 7a so as to impart the desired biasing pressure to buffer plate 9 and pressure frame 4 through the several springs 21. Thus, with the parts properly adjusted, when handle 13 is in the forward position, as shown in full lines in Figures 1 and 2, the movable mold part 2 is held yieldingly against fixed mold part 1 but with such uniform tightness and precision that, in casting, the molten metal is effectively confined in the mold cavity whether the charging be by hand pouring or by pressure. In the former case, molten metal may be admitted conveniently through a gate, as 22 which preferably affords a passageway to the mold cavity relatively large in cross sectional area; and in the latter case, through a charging tube or gate, as 23, shown dotted in Figure 1 and not provided in molds for hand pouring.

To effectively confine the molten metal to the mold cavity where one of the mold parts or blocks is slightly defective, as where due to inaccurate machining the plane of the outer face of block 1 is not quite parallel with the plane of its inner face, Figure 4, the pressure frame 4 is caused to tilt or rock on rods 7, 7a so that the cavity face of mold part 2 is presented at a slight angle and thus conforms to the angle of the plane of the cavity face of block 1. This adjustment or conforming effect could not occur if the holes 10, for example, were of such diameter in relation to rods 7, 7a as to permit only sliding movement longitudinally of said rods and normal to their axes. It will be understood that the holes 11 in buffer plate 9 permit the same or corresponding tilting of said plate which is imparted to presser frame 4 through the toggle handle 13 and links 14, facilitated by the springs 21. Thus, where one end, as the right end, Figure 4, of mold part 1 is slightly thinner than the left end, presser frame 4 and mold part 2 mounted thereon and being subjected to increased pressure from the springs 21 on the right hand bolts, as 7a, Figure 3, through buffer plate 9 and the right hand toggle link 14, Figure 1, are caused to tilt or swing so that the surface of the inner or cavity side of mold part 2 can come tightly but not rigidly against the opposed corresponding surface of mold part 1.

As shown more clearly in Figures 2 and 5, the movable mold part 2 is provided with sets of holes extending transversely therethrough and which come opposite opening 4a in presser frame 4. One set comprises the holes 24, which open through the flat inner mold surface between the edge of the mold part and its mold cavity 25; and another set includes the holes 26 which open through the cavity surface of mold part 2. Said sets of holes receive and cooperate with two sets of pins mounted on and extending through opening 4a from a pin carrier 27. These pins include a set of guide or alignment pins 28 extending through and freely slidable in the holes 24 in mold part 2 and a set of ejector pins 29 freely slidable in holes 26 and the end faces of which are shaped and adapted when in operative charging position, in effect, to be continuous with those portions of the surface of cavity 25 which lie adjacent to the openings of said holes 26. Said carrier also mounts a third set of pins, as the stop pins 30.

It is contemplated that various sizes and types of cast products require different sizes and kinds of molds; and, in turn that different sizes and kinds of molds may require different sizes of pins and holes and different arrangements thereof. Some of the variables to be considered are the dimensions of the mold and of the mold cavity. In the illustrated embodiment, I show a set of four long guiding or aligning pins 28 mounted adjacent the corners of pin plate 27, a set of four shorter casting ejector or push-out pins 29, and a set of two still shorter stop pins 30. The pin plate 27 and the above described sets of pins mounted thereon are assembled and operated, in effect, as a "floating" unit which is readily insertable in and removable from operative position in relation to mold part 2.

Said pin plate assembly or unit cooperates, in use, with a stop plate 31 having a threaded shank 32 adjustably mounted in a threaded opening in buffer plate 9. For a given mold and its pin plate unit, stop plate 31 will be adjusted longitudinally of the clamp so as to be in the path of movement of pin plate 27 when the latter is withdrawn with the presser frame 4 to retracted position, Figure 5.

In a typical operation, assuming the parts to be in the relative forward positions shown in Figures 1 and 2 and that the molten charge, having been poured into gate 22, has partly or sufficiently congealed, the mold is easily swung on trunnions 8 to bring the mouth of gate 22 into discharging position, or such that any uncongealed metal in the mold cavity will flow out leaving the casting in the form of a hollow shell.

When handle 13 is swung counter clockwise to the dotted line position, Figure 1, on the pivots 12a, pressure frame 4 and mold part 2 thereon are carried rearwardly so that the rear face of pin plate 27 comes into engagement with and is stopped by stop plate 31. Continued rearward movement of mold part 2 brings portions of the rear face thereof against the free ends of stop pins 30 and the retracting movement is completed. The final portion of said rearward movement of said mold part 2 is relative to said pin carrier and the pins thereon so that, as said movement proceeds, the ends of the long guide pins 28 extend through and beyond the inner end openings of the holes 24; and the ends of ejector pins 29 extend through and beyond the inner end openings of holes 26 and immediately engage and tend to displace the casting, as 33, shown dotted in Figure 5, from its position in mold cavity 25.

Where the clamp is rotatable on trunnions 8, the mold may be swung rapidly to any desired angular position which will facilitate charging thereof, discharge of excess core metal and discharge of the casting therefrom. In the apparatus shown, the aligning pins 28 and the ejector pins 29, after being so positioned initially, remain with their ends engaging and extending into the correspondingly placed holes in mold part 2. Thus, said pins are thereby retained in position to bring their free end portions into uniformly accurate operation through repeated casting cycles. As soon as each casting or piece is discharged, the handle 13 is swung clockwise, to the full line position, Figure 1, to bring the mold parts together and in condition for receiving a new charge of molten metal. This mold closing movement of handle 13 may be effected rapidly and with no need for special care or restraint in the amount of force applied so far as that might affect the mold pieces 1 and 2. The buffer and spring arrangement previously described not only produces the face to face conformity of the mold parts on closing, earlier referred to, but also provides a cushioning or damping effect as the mold faces are brought together so that they are not impaired or displaced even with careless operation.

Some of the advantages in operation above referred to apply particularly to the casting of pieces having dome shaped parts or which have multiple transverse piercings. Where the mold parts employed in casting these pieces can be brought into accurate register and with the mold cavity edges tightly closed or fitted, as above described, cleaning of the castings is practically eliminated and such castings can therefore be produced rapidly and at relatively low cost.

What is claimed is:

In casting apparatus for producing turn castings wherein a movable mold part is mounted in position to operatively engage a fixed mold part, and has a toggle connection with a buffer plate, and said buffer plate is slidably supported on a plurality of parallel rods, the combination in which said buffer plate is provided with spaced bearings slidably engaging said rods, said bearings being of such inside diameter in relation to the outside diameter of the rods as to permit tilting of said buffer plate thereon, compression springs arranged on said rods each with one end pressing against a portion of said buffer plate adjacent to one of said bearings, and a nut threaded on each of said rods at the other end of the compression spring to vary the pressure thereof differentially in relation to other of said springs and thereby to bias the buffer plate at an angle to the axes of said rods, said toggle connection having a lever movable from retracted position in a direction to bring said buffer plate into spring pressure transmitting relation to the presser frame and thereby to releasably retain the movable mold part yieldingly in conforming angular relation and cavity closing contact with the fixed mold part, a pin carrier, a set of ejector pins for dislodging a casting from the open mold cavity and a set of carrier supporting pins mounted in parallel relation on said carrier, said sets of pins slidably engaging spaced parallel holes extending transversely through said movable mold part thereby to support said carrier directly on said mold part and being freely slidable therein at different angular positions of the contact face of the moving mold part in relation to the opposed face of the fixed mold part and to the axes of said rods; a stop plate adjustably mounted on said buffer plate and arranged to be engaged by and to stop said pin carrier against spring pressure when said toggle lever is actuated toward retracted position to open the mold and discharge a casting therefrom, and stop means mounted on said pin carrier in position to be engaged by and to stop said movable mold part while said pin carrier is stopped by said stop plate, to limit the extent of casting ejecting movement of said movable mold part in relation to said ejector pins.

References Cited in the file of this patent

UNITED STATES PATENTS

| Number | Name | Date |
|---|---|---|
| 1,394,246 | Bolling | Oct. 18, 1921 |
| 1,534,266 | Hotter | Apr. 21, 1925 |
| 1,622,875 | Lee | Mar. 29, 1927 |
| 1,663,072 | During | Mar. 20, 1928 |
| 1,855,783 | Wood | Apr. 26, 1932 |
| 1,880,380 | Frantz | Oct. 4, 1932 |
| 1,925,495 | Nichols et al. | Sept. 5, 1933 |
| 2,094,079 | Parker | Sept. 28, 1937 |
| 2,137,217 | Rieg | Nov. 15, 1938 |
| 2,244,123 | Sebek | June 3, 1941 |
| 2,289,928 | Parker | July 14, 1942 |
| 2,547,081 | Lund | Apr. 3, 1951 |